United States Patent
Cannon, Sr.

(10) Patent No.: US 6,341,791 B1
(45) Date of Patent: Jan. 29, 2002

(54) WHEELCHAIR AND BICYCLE COMBINATION ASSEMBLY

(76) Inventor: Sammie L. Cannon, Sr., 10258 S. Elizabeth, Chicago, IL (US) 60643

( * ) Notice: Subject to any disclaimer, the term of this patent is extended or adjusted under 35 U.S.C. 154(b) by 0 days.

(21) Appl. No.: 09/621,991

(22) Filed: Jul. 21, 2000

(51) Int. Cl.⁷ .............................................. B62K 27/00
(52) U.S. Cl. .................................... 280/204; 280/250.1
(58) Field of Search ................................ 280/202, 204, 280/250.1, 242.1, 297, 304.1

(56) References Cited

U.S. PATENT DOCUMENTS

| | | | |
|---|---|---|---|
| 1,059,466 A | * 4/1913 | Hosmer ...................... 280/202 |
| D149,194 S | * 4/1948 | Larralde ..................... D12/112 |
| 2,482,585 A | * 9/1949 | Hauptman ................... 280/202 |
| 3,429,584 A | 2/1969 | Hendricks | |
| 4,373,740 A | 2/1983 | Hendrix | |
| 4,402,502 A | 9/1983 | Peters | |
| 4,705,284 A | 11/1987 | Stout | |
| 4,767,130 A | * 8/1988 | Fu-Chao ..................... 280/202 |
| 4,770,431 A | * 9/1988 | Kulik ......................... 280/202 |
| 4,830,388 A | * 5/1989 | Wang ......................... 280/202 |
| 5,273,304 A | 12/1993 | Berkheimer | |
| D356,530 S | 3/1995 | Bee et al. | |

FOREIGN PATENT DOCUMENTS

| | | |
|---|---|---|
| DE | 3743477 | * 7/1989 |
| EP | 0249709 | * 12/1987 |

* cited by examiner

Primary Examiner—J. J. Swann
Assistant Examiner—David Divine

(57) ABSTRACT

A wheelchair and bicycle combination assembly for pushing a wheelchair while riding a bike. The wheelchair and bicycle combination assembly includes a bicycle frame. A seat assembly slidably mounts to the bicycle frame. A gear assembly comprises at least a first gear and a second gear. The first gear is rotatably coupled to a front portion of the frame. The second gear is rotatably coupled to a back portion of the frame. A bike chain extends around and is in communication with teeth on the first and second gears. A crank axle extends through the first gear. The crank axle has a pair of ends. Each of a pair of pedals is rotatably coupled to one of the ends of the crank axle. A bike wheel is securely attached to the second gear. A wheelchair includes a seat portion. A back rest is securely coupled to and extends upwardly from a back edge of the seat portion. A pair of front wheels and a pair of rear wheels are rotatably coupled to the seat portion. An axle extends between the back wheels. Each of a pair of handles is coupled to and extends upwardly away from a top edge of the back rest. A coupling means removably attaches the bicycle frame to the axle of the wheelchair.

9 Claims, 3 Drawing Sheets

WHEELCHAIR AND BICYCLE COMBINATION ASSEMBLY

BACKGROUND OF THE INVENTION

1. Field of the Invention

The present invention relates to bicycle devices and more particularly pertains to a new wheelchair and bicycle combination assembly for pushing a wheelchair while riding a bike.

2 Description of the Prior Art

The use of bicycle devices is known in the prior art. More specifically, bicycle devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 3,429,584; 4,402, 502; 4,705,284; U.S. Pat. No. Des. 356,530; U.S. Pat. Nos. 4,373,740; and 5,273,304.

While these devices fulfill their respective, particular objectives and requirements, the aforementioned patents do not disclose a new wheelchair and bicycle combination assembly. The inventive device includes a bicycle frame. A seat assembly slidably mounts to the bicycle frame. A gear assembly comprises at least a first gear and a second gear. The first gear is rotatably coupled to a front portion of the frame. The second gear is rotatably coupled to a back portion of the frame. A bike chain extends around and is in communication with teeth on the first and second gears. A crank axle extends through the first gear. The crank axle has a pair of ends. Each of a pair of pedals is rotatably coupled to one of the ends of the crank axle. A bike wheel is securely attached to the second gear. A wheelchair includes a seat portion. A back rest is securely coupled to and extends upwardly from a back edge of the seat portion. A pair of front wheels and a pair of rear wheels are rotatably coupled to the seat portion. An axle extends between the back wheels. Each of a pair of handles is coupled to and extends upwardly away from a top edge of the back rest. A coupling means removably attaches the bicycle frame to the axle of the wheelchair.

In these respects, the wheelchair and bicycle combination assembly according to the present invention substantially departs from the conventional concepts and designs of the prior art, and in so doing provides an apparatus primarily developed for the purpose of pushing a wheelchair while riding a bike.

SUMMARY OF THE INVENTION

In view of the foregoing disadvantages inherent in the known types of bicycle devices now present in the prior art, the present invention provides a new wheelchair and bicycle combination assembly construction wherein the same can be utilized for pushing a wheelchair while riding a bike.

The general purpose of the present invention, which will be described subsequently in greater detail, is to provide a new wheelchair and bicycle combination assembly apparatus and method which has many of the advantages of the bicycle devices mentioned heretofore and many novel features that result in a new wheelchair and bicycle combination assembly which is not anticipated, rendered obvious, suggested, or even implied by any of the prior art bicycle devices, either alone or in any combination thereof.

To attain this, the present invention generally comprises a bicycle frame. A seat assembly slidably mounts to the bicycle frame. A gear assembly comprises at least a first gear and a second gear. The first gear is rotatably coupled to a front portion of the frame. The second gear is rotatably coupled to a back portion of the frame. A bike chain extends around and is in communication with teeth on the first and second gears. A crank axle extends through the first gear. The crank axle has a pair of ends. Each of a pair of pedals is rotatably coupled to one of the ends of the crank axle. A bike wheel is securely attached to the second gear. A wheelchair includes a seat portion. A back rest is securely coupled to and extends upwardly from a back edge of the seat portion. A pair of front wheels and a pair of rear wheels are rotatably coupled to the seat portion. An axle extends between the back wheels. Each of a pair of handles is coupled to and extends upwardly away from a top edge of the back rest. A coupling means removably attaches the bicycle frame to the axle of the wheelchair.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new wheelchair and bicycle combination assembly apparatus and method which has many of the advantages of the bicycle devices mentioned heretofore and many novel features that result in a new wheelchair and bicycle combination assembly which is not anticipated, rendered obvious, suggested, or even implied by any of the prior art bicycle devices, either alone or in any combination thereof.

It is another object of the present invention to provide a new wheelchair and bicycle combination assembly which may be easily and efficiently manufactured and marketed.

It is a further object of the present invention to provide a new wheelchair and bicycle combination assembly which is of a durable and reliable construction.

An even further object of the present invention is to provide a new wheelchair and bicycle combination assembly which is susceptible of a low cost of manufacture with regard to both materials and labor, and which accordingly is then susceptible of low prices of sale to the consuming public, thereby making such wheelchair and bicycle combination assembly economically available to the buying public.

Still yet another object of the present invention is to provide a new wheelchair and bicycle combination assembly which provides in the apparatuses and methods of the prior art some of the advantages thereof, while simultaneously overcoming some of the disadvantages normally associated therewith.

Still another object of the present invention is to provide a new wheelchair and bicycle combination assembly for pushing a wheelchair while riding a bike.

Yet another object of the present invention is to provide a new wheelchair and bicycle combination assembly which includes a bicycle frame. A seat assembly slidably mounts to the bicycle frame. A gear assembly comprises at least a first gear and a second gear. The first gear is rotatably coupled to a front portion of the frame. The second gear is rotatably coupled to a back portion of the frame. A bike chain extends around and is in communication with teeth on the first and second gears. A crank axle extends through the first gear. The crank axle has a pair of ends. Each of a pair of pedals is rotatably coupled to one of the ends of the crank axle. A bike wheel is securely attached to the second gear. A wheelchair includes a seat portion. A back rest is securely coupled to and extends upwardly from a back edge of the seat portion. A pair of front wheels and a pair of rear wheels are rotatably coupled to the seat portion. An axle extends between the back wheels. Each of a pair of handles is coupled to and extends upwardly away from a top edge of the back rest. A coupling means removably attaches the bicycle frame to the axle of the wheelchair.

Still yet another object of the present invention is to provide a new wheelchair and bicycle combination assembly that allows a person to easily push a wheelchair with less effort and in a relaxing manner.

Even still another object of the present invention is to provide a new wheelchair and bicycle combination assembly that may be retrofitted to existing wheelchairs.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
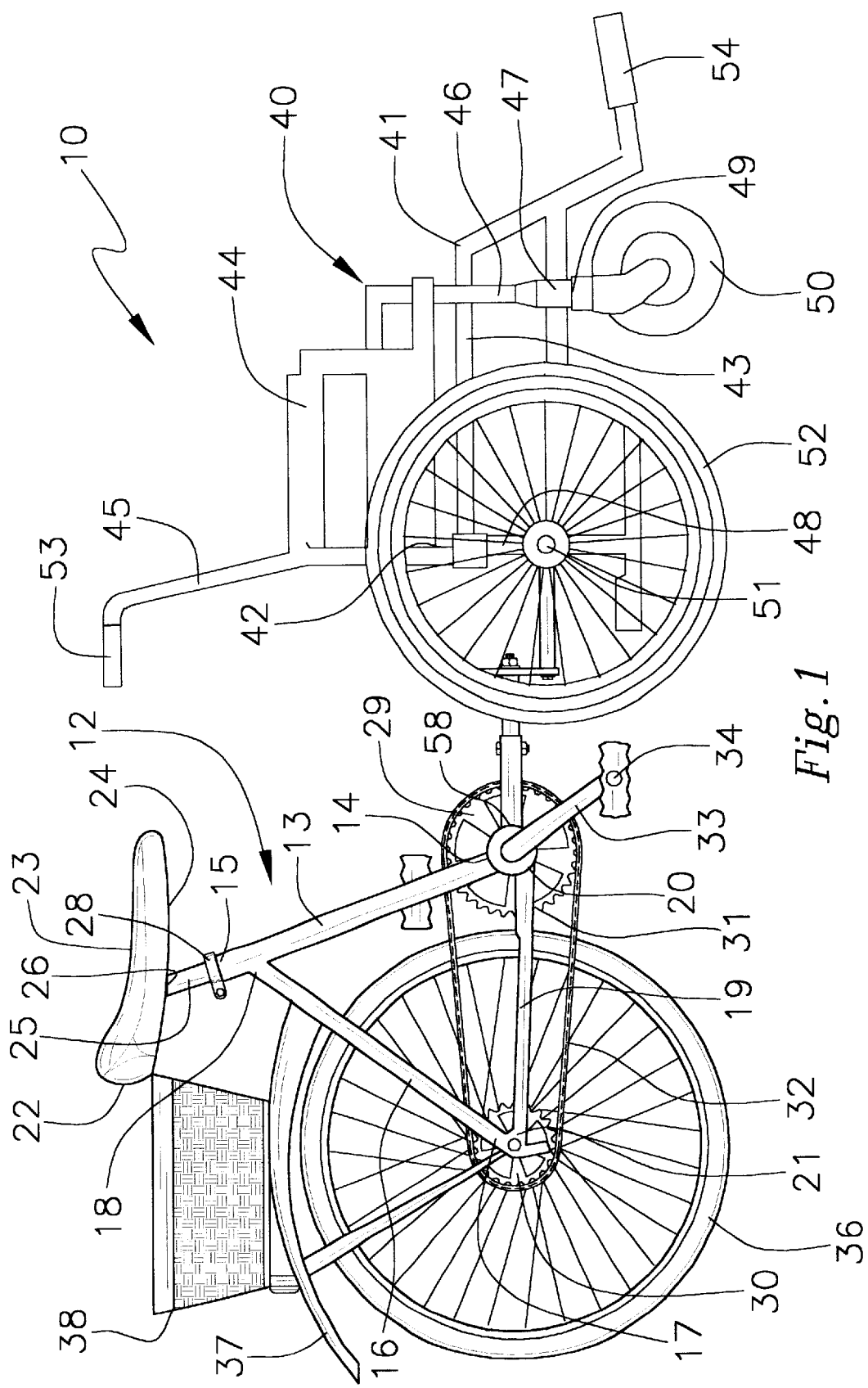
FIG. 1 is a schematic side view of a new wheelchair and bicycle combination assembly according to the present invention.
Figure 2:
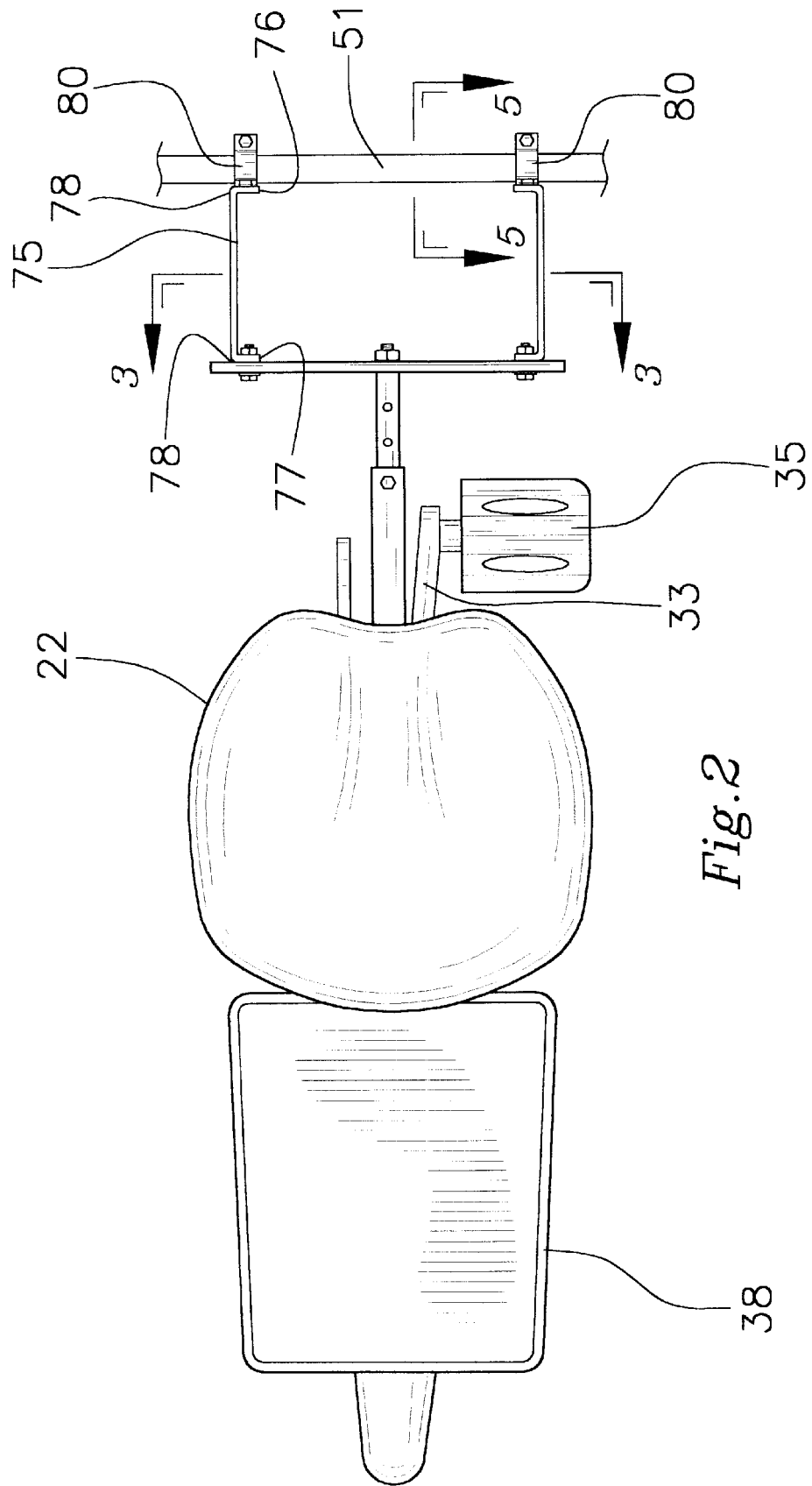
FIG. 2 is a schematic top view of the present invention.
Figure 3:
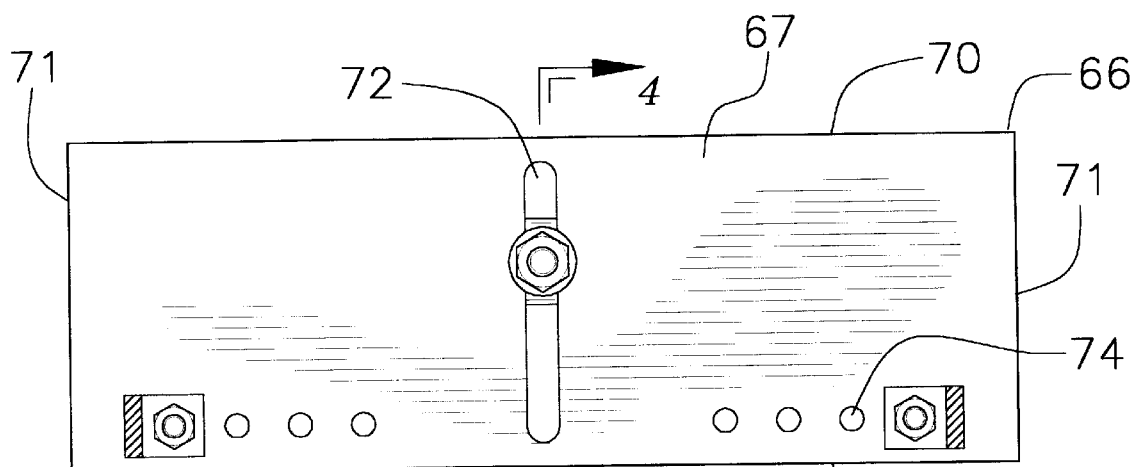
FIG. 3 is a schematic front view taken along line 3—3 of the present invention.
Figure 4:
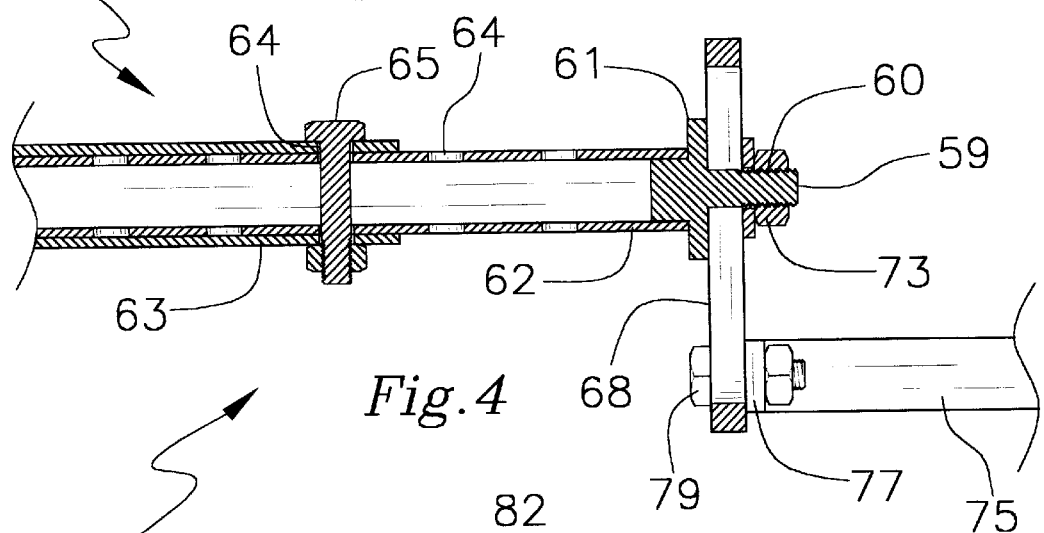
FIG. 4 is a schematic side cross-sectional view taken along line 4—4 of the present invention.
Figure 5:
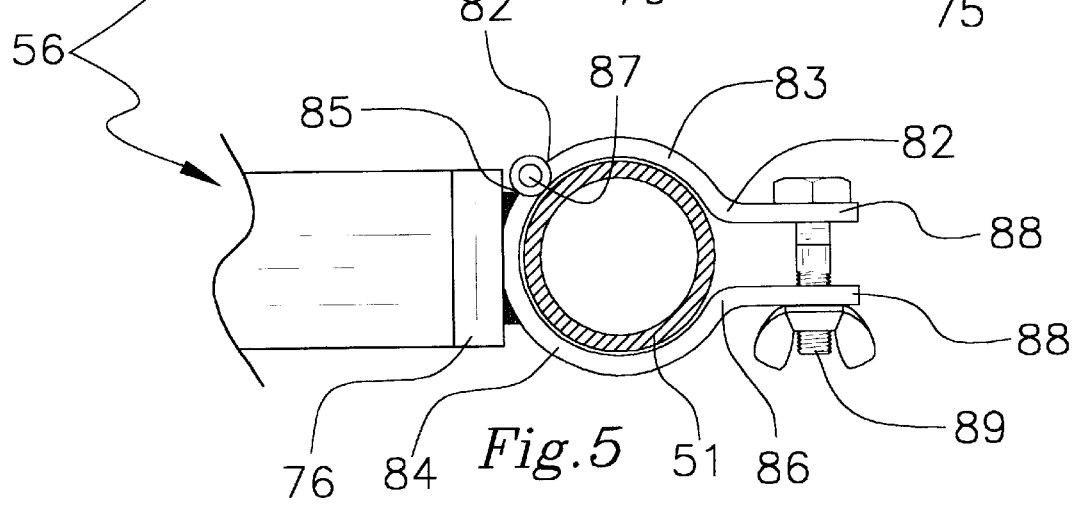
FIG. 5 is a schematic side cross-sectional view taken along line 5—5 of the present invention.

With reference now to the drawings, and in particular to FIGS. 1 through 5 thereof, a new wheelchair and bicycle combination assembly embodying the principles and concepts of the present invention and generally designated by the reference numeral 10 will be described.

As best illustrated in FIGS. 1 through 5, the wheelchair and bicycle combination assembly 10 generally comprises a bicycle frame 12. The bicycle frame 12 comprises a seat tube 13. The seat tube 13 has a first end 14 and second end 15. The second end 14 is open. A tire mounting tube 16 has a first end 17 and a second end 18. The second end 18 of the tire mounting tube is integrally coupled to the seat tube 13. The second end 18 of the tire mounting tube 16 is positioned generally adjacent to the second end 15 of the seat tube 13. A support bar 19 has a first end 20 and a second end 21. The first end 20 of the support bar 19 is integrally coupled to the first end 14 of the seat tube 13. The second end 21 of the support bar 19 is integrally coupled to the first end 17 of the tire mounting tube 16 such that the seat tube 13, the tire mounting tube 16 and the support bar 19 generally define a triangle. The second end 15 of the seat tube 13 is an apex of the triangle. The first end 14 of the seat tube 13 defines a front portion of the frame 12 and the first end 17 of the tire mounting tube 16 defines a back portion of the frame 12.

A seat assembly comprises a seat member 22 having a top side 23 and a bottom side 24. The seat member 22 depicted is a bucket-type seat for comfort.

A seat post 25 has a first end 26 and a second end not shown. The first end 26 is securely attached to the bottom side 24 of the seat member 22. The second end of the seat post 25 is selectively extendable into the second end 15 of the seat tube 13.

A seat lug 28 selectively secures the seat post 25 with respect to the seat tube 13. The seat lug 28 is securely coupled to the second end 15 of the seat tube 13.

A gear assembly comprises a first gear 29 and a second gear 30. The first gear 29 is rotatably coupled to the frame 12 and positioned at a juncture of the seat tube 13 and the support bar 19. The second gear 30 is rotatably coupled to the frame 12 and positioned at a juncture of the support bar 19 and the tire mounting tube 16. Each of the gears has a peripheral edge having a plurality of teeth 31 extending therefrom. A bike chain 32 extends around and is in communication with the teeth 31 on the first 29 and second 30 gears. A crank axle 33 extends through the first gear 29 and is securely attached to the first gear. The crank axle 33 has a pair of ends 34. Each of a pair of pedals 35 is rotatably coupled to one of the ends 33 of the crank axle 32. A bike wheel 36 is securely attached to the second gear 30. The bike wheel 36 is generally co-axial with the second gear 30. The bicycle frame 12, gears and wheel generally form a conventional bike having the front steering column and front tire removed. A braking means, not shown, for braking the bike would comprise conventional braking devices.

Additionally, a fender 37 may be placed over the back wheel and basket 38 securely attached to the fender.

The wheelchair 40 comprises a seat portion 41. The seat portion 40 has a front edge 41, a back edge 42, and two side edges 43. The seat portion 41 has a generally rectangular shape. Each of a pair of arm rests 44 is securely attached to each one of the side edges 43 and each extends upwardly therefrom. A back rest 45 is securely coupled to and extends upwardly from the back edge 45 of the seat portion 41.

Each of four elongate rods 46 is securely attached to the seat portion 41 and each is positioned generally adjacent to a corner of seat portion. The rods 46 extend downwardly from the seat portion 41 such that there are two front rods 47 and two rear rods 48. Each of the rods 46 has a free end 49 and each of a pair of front wheels 50 is rotatably coupled to one of the free ends 49 of the front rods 47. The front wheels 50 are adapted to pivot. An axle 51 is securely coupled to and extends between the free ends 47 of the rear rods 48. Each of a pair of back wheels 52 is rotatably coupled to an opposite end of the axle 51.

Each of a pair of handles 53 is coupled to and extending upwardly from a top edge of the back rest 45. The handles 53 are spaced. The wheelchair 40 is generally a conventional wheelchair.

A coupling means 56 couples the bicycle frame 12 to the wheelchair 40. The coupling means 56 includes a coupling bar 57. The coupling bar 57 has a first end 58 and a second end 59. The first end 58 is integrally coupled to the bicycle frame 12 and positioned at a juncture of the seat tube 13 and the support bar 19. A peripheral wall 60 of the coupling bar 57 is threaded. The threads are generally adjacent to the second end 59 of the coupling bar 57. An annular lip 61 is integrally coupled to the peripheral wall 60. The annular lip 61 is positioned generally adjacent to the threads. The coupling bar 57 is a telescoping bar. The coupling bar comprises a first portion 62 and a second portion 63. The first portion 62 is slidably extendable in the second portion 63. The first 62 and second 63 portions each have a plurality of aligned apertures 64 therein. The apertures 64 extend through opposite sides of the portions. A bolt 65 extends through an aperture 64 in the second portion 63 and through an aperture 64 in the first portion 62 to selectively couple the first portion in a fixed extended position with relation to the second portion.

A plate 66 has a front side 67, a back side 68, a bottom edge 69, a top edge 70 and two side edges 71. The plate 61 has a elongate slot 72 therethrough. The slot 72 is positioned generally between the side edges 71 and orientated generally parallel to the side edges 71. The second end 59 of the coupling bar 57 is extendable through the slot 72 such that the annular lip 61 abuts the back side 68 of the plate 66. A nut 73 is removably couplable to the threads such that the second end 59 of the coupling bar 57 may be selectively positioned between the top 70 and bottom 69 edges of the plate 66. This aids in placement of the bicycle frame 12 with relation to the wheelchair 40. The plate 61 has a plurality of holes therein 74. The holes 74 are substantially adjacent to the bottom edge 69 of the plate 66.

Each of a pair of extension rods 75 has a proximal end 76 and a distal end 77. Each of the rods 75 has a pair of bends 78 therein. The bends 78 are generally adjacent to one of the ends 76 of the extension rods 75. The extension rods 75 generally have a U-shape. Each of the rods 75 has an opening, not shown, therein. Each of the openings is between one of the distal ends 77 and a generally adjacent bend 78. A pair of fastening means 79 fastens the distal ends of the extension rods 75 to the plate 66. Each of the fastening means 79 is extendable through one of the openings in the extension rods and one of the holes 74 in the plate 66. The fastening means 79 are preferably bolts and accompanying nuts.

Each of a pair of ring members 80 is securely coupled to the extension rods 75 and positioned between the proximal ends 76 and an adjacent bend 78 in the extension rods. Each of the ring members 80 has a pair of breaks 82 therein such that a first 83 and second 84 section is defined. Each of the sections has a first end 85 and a second end 86. The first ends 85 of the sections are hingedly coupled together by a hinge 87. The second ends 86 of the sections have a flange 88 integrally coupled thereto. Each of the flanges 88 has a bore, not shown, therethrough. Each of a pair of securing means 89 removably securing the flanges 88 together and is extendable through the bores in the flanges 88. The securing means 89 are preferably bolts and wing nuts. The ring members 80 are positionable around the axle 51 of the wheelchair 40.

In use, a person is placed in the wheelchair 40. The wheelchair 40 may have a leg support 54 coupled thereto. A second person then rides the bicycle portion like a traditional bike.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A wheelchair and bicycle combination device, said device comprising:

a bicycle frame;

a seat assembly slidably mounted to said bicycle frame;

a gear assembly, said gear assembly comprising at least a first gear and a second gear, said first gear being rotatably coupled to a front portion of said frame, said second gear being rotatably coupled to a back portion of said frame, a bike chain extending around and in communication with teeth on said first and second gears, a crank axle extending through said first gear, said crank axle having a pair of ends, each of a pair of pedals being rotatably coupled to one of said ends of said crank axle, a bike wheel being securely attached to said second gear;

a wheelchair, said wheelchair comprising;

a seat portion;

a back rest being securely coupled to and extending upwardly from a back edge of said seat portion;

a pair of front wheels and a pair of rear wheels being rotatably coupled to said seat portion, an axle extending between said back wheels;

a pair of handles, each of said handles being coupled and extending upwardly from a top edge of said back rest; and a coupling means removably attaches said bicycle frame to said axle of said wheelchair;

said bicycle frame comprising a seat tube, said seat tube having a first end and second end, said second end being open, a tire mounting tube, said tire mounting tube having a first end and a second end, said second end of said tire mounting tube being integrally coupled to said seat tube, said second end of said tire mounting tube being positioned generally adjacent to said second end of said seat tube, a support bar, said support bar having a first end and a second end, said first end of said support bar being integrally coupled to said first end of said seat tube, said second end of said support bar being integrally coupled to said first end of said tire mounting tube such that said seat tube, said tire mounting tube and said support bar generally defining a triangle such that said second end of said seat tube is an apex of said triangle, said first end of said seat tube defining said front portion of said bicycle frame, said first end of said tire mounting tube defining said back portion of said bicycle frame;

said coupling means comprising:

a coupling bar, said coupling bar having a first end and a second end, said first end being integrally coupled to said bicycle frame and positioned at a juncture of said seat tube and said support bar, a peripheral wall of said coupling bar being threaded, said threads being generally adjacent to said second end of said coupling bar;

a plate, said plate having a front side, a back side, a bottom edge, a top edge and two side edges, said plate having a elongate slot therethrough, said slot being positioned generally between said side edges and orientated generally parallel to said side edges, said second end of said coupling bar being extendable through said slot, a nut being removably couplable to said threads such that said second end of said coupling bar may be selectively positioned between said top and bottom edges of said plate;

a pair of extension rods, each of said extension rods having a proximal end and a distal end, each of said distal ends being securely attached to said front side of said plate; and a pair of ring members, each of said ring members being securely coupled to said proximal ends of said extension rods, each of said ring members having a pair of breaks therein such that a first and second section are defined, each of said sections having a first end and a second end, said first ends of said sections being hingedly coupled together by a hinge, said second ends of said sections having an flange integrally coupled thereto, each of said flanges having a bore therethrough, each of a pair of securing means removably securing said flanges together and being extendable through said bores in said flanges, wherein said ring members are positionable around said axle of said wheelchair.

2. The wheelchair and bicycle combination device as in claim 1, wherein said seat assembly further comprises:

a seat member, said seat member having a top side and a bottom side;

a seat post, said seat post having a first end and a second end, said first end being securely attached to said bottom side of said seat member, said second end of said seat post being selectively extendable into said second end of said seat tube;

a seat lug for selectively securing said seat post with respect to said seat tube, said seat lug being securely coupled to said second end of said seat tube.

3. The wheelchair and bicycle combination device as in claim 1, wherein said wheelchair comprises:

said seat portion having a front edge, a back edge, and two side edges, said seat portion having a generally rectangular shape;

each of a pair of arm rests being securely attached to each one of said side edges and ending upwardly therefrom; and four elongate rods, each of said rods being securely attached to said seat portion and each being positioned generally adjacent to a corner of seat portion, said rods extending downwardly from said seat portion such that there are two front rods and two rear rods, each of said rods having a free end, each of said front wheels being rotatably coupled to one of said free ends of said front rods, said wheels being adapted to pivot, said axle being securely coupled to and extending between said free ends of said rear rods.

4. A bicycle device for pushing a wheelchair, the wheelchair having an axle having a pair of back wheels coupled thereto, said device comprising:

a bicycle frame;

a seat assembly slidably mounted to said bicycle frame;

a gear assembly, said gear assembly comprising at least a first gear and a second gear, said first gear being rotatably coupled to a front portion of said frame, said second gear being rotatably coupled to a back portion of said frame, a bike chain extending around and in communication with teeth on said first and second gears, a crank axle extending through said first gear, said crank axle having a pair of ends, each of a pair of pedals being rotatably coupled to one of said ends of said crank axle, a bike wheel being securely attached to said second gear;

a coupling means removably attaches said bicycle frame to said axle of said wheelchair, said coupling means comprises:

a coupling bar, said coupling bar having a first end and a second end, said first end being integrally coupled to said front portion of said bicycle frame, a peripheral wall of said coupling bar being threaded, said threads being generally adjacent to said second end of said coupling bar;

a plate, said plate having a front side, a back side, a bottom edge, a top edge and two side edges, said plate having a elongate slot therethrough, said slot being positioned generally between said side edges and orientated generally parallel to said side edges, said second end of said coupling bar being extendable through said slot, a nut being removably couplable to said threads such that said second end of said coupling bar may be selectively positioned between said top and bottom edges of said plate;

a pair of extension rods, each of said extension rods having a proximal end and a distal end, each of said distal ends being securely attached to said front side of said plate; and a pair of ring members, each of said ring members being securely coupled to said proximal ends of said extension rods, each of said ring members having a pair of breaks therein such that a first and second section are defined, each of said sections having a first end and a second end, said first ends of said sections being hingedly coupled together by a hinge, said second ends of said sections having an flange integrally coupled thereto, each of said flanges having a bore therethrough, each of a pair of securing means removably securing said flanges together and being extendable through said bores in said flanges, wherein said ring members are positionable around said axle of said wheelchair.

5. A system for moving a wheelchair of the type having an axle extending between rear wheels, said system comprising:

a bicycle frame comprising a seat tube having a first end and an open second end, a tire mounting tube having a first end and a second end, said second end of said tire mounting tube being integrally coupled to said seat tube, a support bar having a first end and a second end, said first end of said support bar being coupled to said first end of said seat tube, said second end of said support bar being coupled to said first end of said tire mounting tube such that said seat tube, said tire mounting tube and said support bar are in a generally triangular arrangement, said first end of said seat tube defining said front portion of said bicycle frame, said first end of said tire mounting tube defining said back portion of said bicycle frame;

a seat assembly mounted on said bicycle frame;

a bike wheel being rotatably mounted on said bicycle frame;

a coupling means for removably coupling said bicycle frame to the axle of the wheelchair, said coupling means comprising:

a coupling bar having a first end and a second end, said first end being coupled to said bicycle frame and positioned at a juncture of said seat tube and said support bar;

a plate having a front side and a back side, said plate having an elongate slot therethrough with said second end of said coupling bar being movably mounted on said slot, said slot being positionable in a perpendicular relationship with respect to a ground surface such that a position of said plate is adjustable in a substantially vertical direction with respect to said coupling bar;

a pair of extension rods mounted on and extending from said plate in a direction opposite from the coupling bar, said pair of extension rods being laterally spaced from each other; and a pair of ring members, each of said ring members being coupled to said extension rods for coupling to the axle of the wheel chair at laterally spaced locations on said axle;

wherein said coupling bar comprising a pair of bar sections telescopically mounted together such that a length of said coupling bar between said first and second ends is adjustable to adjusting a distance between said frame and said plate; and wherein said plate has a plurality of mounting locations for said extension rods such that a transverse distance between said extension rods is adjustable.

6. The system of claim 5 wherein each of said ring members has a pair of breaks therein such that a first and second section are defined, each of said sections having a first end and a second end, said first ends of said sections being hingedly coupled together by a hinge, said second ends of said sections having an flange coupled thereto, each of said flanges having a bore therethrough, each of a pair of securing means removably securing said flanges together and being extendable through said bores in said flanges, wherein said ring members are positionable around the axle of the wheelchair.

7. The system of claim 5 additionally comprising a wheelchair including a seat portion, a back rest being securely coupled to and extending upwardly from a back edge of said seat portion, a pair of front wheels and a pair of rear wheels being rotatably coupled to said seat portion, an axle extending between said back wheels, and a pair of handles, each of said handles being coupled and extending upwardly from a top edge of said back rest.

8. The system of claim 5 additionally comprising a gear assembly comprising at least a first gear and a second gear, said first gear being rotatably coupled to a front portion of said frame, said second gear being rotatably coupled to a back portion of said frame, a bike chain extending around and in communication with teeth on said first and second gears, each of a pair of pedals being rotatably coupled to said first gear.

9. The system of claim 7, wherein said wheelchair further comprises:

said seat portion having a front edge, a back edge, and two side edges, said seat portion having a generally rectangular shape;

each of a pair of arm rests being securely attached to each one of said side edges and ending upwardly therefrom; and four elongate rods, each of said rods being securely attached to said seat portion and each being positioned generally adjacent to a corner of seat portion, said rods extending downwardly from said seat portion such that there are two front rods and two rear rods, each of said rods having a free end, each of said front wheels being rotatably coupled to one of said free ends of said front rods, said wheels being adapted to pivot, said axle being securely coupled to and extending between said free ends of said rear rods.

* * * * *